United States Patent Office 3,658,862
Patented Apr. 25, 1972

3,658,862
PREPARATION OF HEXAARYLDILEAD COMPOUNDS
Louis C. Willemsens, Utrecht, Netherlands, assignor to International Lead Zinc Research Organization, Inc., New York, N.Y.
No Drawing. Continuation-in-part of application Ser. No. 849,198, Aug. 11, 1969. This application Nov. 25, 1970, Ser. No. 92,914
Claims priority, application Netherlands, Sept. 3, 1968, 12,535
Int. Cl. C07f 7/24
U.S. Cl. 260—437 R    8 Claims

ABSTRACT OF THE DISCLOSURE

A process for preparing hexaaryldilead compounds comprises reacting a triarylplumbyl magnesium halide compound of the general formula $Ar_3PbMgX$, wherein Ar is a substituted or unsubstituted aryl group selected from the group consisting of phenyl, naphthyl and such groups substituted by halogen, lower alkyl and lower alkoxy and X is halogen, with a vicinal dihalogen alkane of 2–6 carbon atoms having the general formula

R—CHX—CHX—R' in which R and R' are hydrogen or aliphatic hydrocarbon radicals and X is halogen and immediately isolating the hexaaryldilead end product precipitated.

---

This is a continuation-in-part of application Serial No. 849,198, filed Aug. 11, 1969, now abandoned.

This invention related to a novel process for the preparation of organolead compounds, and more particularly, to a process for preparing hexaaryldilead compounds from triaryllead magnesium halide compounds.

At the present time, hexaaryldilead compounds are most economically prepared by reacting aryl magnesium halides with lead dichloride according to the following reaction:

There are, however, several disadvantages in manufacturing hexaaryldilead compounds by this method. Theoretically, only two-thirds of the lead starting material can be arylated since one-third is precipitated as metallic lead, which, in addition, causes difficulties in working up the reaction mixture. Consequently, the yield by this method has been consistently unsatisfactory, rarely reaching over 75% (phenyl) and in some instances falling as low as 5% (naphthyl) (based on the equation above).

Accordingly, it is an object of the present invention to provide a method for the preparation of hexaaryldilead compounds which effects a substantially complete conversion of lead starting material into end product to produce consistently high overall yields.

It is another object to provide a method for the preparation of hexaaryldilead compounds by the reaction of a triarylplumbyl metal compound with a vicinal dihalogen alkane.

These and other objects of the present invention are accomplished by causing a triarylpumbyl metal compound having the general formula, $Ar_3PbMgX$, wherein Ar is a substituted or unsubstituted aryl group selected from the group consisting of phenyl, naphthyl and such groups substituted by halogen, lower alkyl and lower alkoxy and X is halogen, preferably fluorine, chlorine or bromine, to chemically react with a vicinal dihalogen alkane of the general formula, R—CHX—CHX—R', having a total of 2–6 carbon atoms and wherein R and R' designate hydrogen or aliphatic hydrocarbon radicals and X is halogen, with the subsequent and immediate isolation of the hexaaryldilead end product. The following reaction scheme occurs:

$$2Ar_3PbMgX + C_2H_4X_2 \rightarrow Ar_6Pb_2 + 2MgX + C_2H_4\uparrow \quad (I)$$

The end product is immediately isolated to minimize side reactions which unfavorably affect the final yield.

In a preferred embodiment of the invention, the triarylplumbyl metal compound is prepared in situ by dissolving a leaddihalide, such as $PbCl_2$ and $PbBr_2$, in a solution of an aryl magnesium halide compound of the general formula, ArMgX wherein Ar is a substituted or unsubstituted aryl group selected from the group consisting of phenyl, naphthyl and such groups substituted by halogen, lower alkyl and lower alkoxy and X is a halogen atom, preferably fluorine, chlorine and bromine and a suitable solvent, such as tetrahydrofuran. The following reaction scheme occurs:

$$PbX_2 + 3ArMgX \rightarrow Ar_3PbMgX + 2MgX_2 \quad (II)$$

The triarylplumbyl metal as an intermediate in Reaction II is a complex, and therefore, this reaction must be carried out in a solvent wherein this complex does not dissociate and remains stable. Since the stability of the triarylplumbyl metal in solution decreases as the electron-donating or complexing power of the solvent decreases, the solvent must be capable of donating a sufficient number of electrons to stabilize the lead metal complex. Thus, a triarylplumbyl metal complex of relatively low stability requires the presence of a more powerful electron-donating solvent to attain a stable reaction mixture, and consequently, to obtain high yields. Since tetrahydrofuran is a solvent of strong electron-donating properties, high yields have been achieved with it for a large number of triarylplumbyl metal compounds.

A vicinal dihalogen alkane of from 2–6 carbon atoms having the general formula, R—CHX—CHX—R' wherein R and R' are aliphatic hydrocarbon radicals or hydrogen and X is halogen, is subsequently added to the Reaction II mixture to precipitate the desired hexaaryldilead compound.

As previously indicated, the aryl group of the starting material of Reactions I and II may be substituted or unsubstituted phenyl and naphthyl. The contemplated substituted aryl groups are those with substituents which do not react with arylating agents, such as halogen, lower alkyl and lower alkoxy. Examples are chlorophenyl, tolyl, xylyl and methoxyphenyl.

The vicinal dihalogen alkane is preferably 1,2-dichloroethane or 1,2-dibromoethane. For the purposes of my invention, 1,2-diiodopropane, 2,3-dichlorobutane or 1,2-dibromopentane may also be used. A number of factors should be considered in selecting a proper dihalogen alkane, such as the effect upon the rate of reaction and possibility of unfavorable side reactions. For instance, 1,2-dibromoethane should be used in the preparation of hexa-2-naphthyldilead instead of 1,2-dichloroethane since the dichloro compound reacts too slowly. However, when the triarylplumbyl metal intermediate is formed in situ with Grignard reagent by Reaction II, the dichloroalkane is preferred since 1,2-dibromoethane reacts with any excess Grignard to form the corresponding tetraaryllead compound, thus lowering the yield of the desired hexaaryldilead compound.

Though tetrahydrofuran is the preferred solvent for Reaction II, any solvent of similar electron-donating power and in which the lead-metal complex intermediate does not dissociate and remains stable is suitable, such as hexamethylphosphoric triamide, triethylamine, pyridine and 1,2-dimethoxyethane. While the electron-donating or complexing power of diethyl ether and dioxane is not as strong as tetrahydrofuran, these compounds may be used as solvents for some of the more stable triarylplumbyl metal complexes.

In general, stoichiometric weight ratios of the reactants provide satisfactory yields. An excess of the dihalogen alkane in Reaction I or II will not, however, affect the yield adversely.

The reaction can be carried out at temperatures of −22 to 50° C., and preferably, at ambient temperature. If the reaction is carried out on a large scale, some cooling is sometimes desired as the reaction is exothermic.

Though the concentration of the reactants is not critical, 0.1–1.0 mole triarylplumbyl metal compound solutions have resulted in high yields.

The formation of the desired hexaaryldilead compound is complete and the process is finished when a test sample of the end product on hydrolyzing does not show a temporary reddening. With regard to reaction time, 1,2-dibromoethane causes the reaction to proceed so quickly (within 15 minutes) that evolution of ethylene gas is observed. On the other hand, 1,2-dichloroethane reacts more slowly and the reaction is completed only after standing overnight.

The hexaaryldilead end product may be isolated by hydrolyzing the reaction mixture according to known procedures. The nature of the aryl group in the hexaaryldilead compound formed will determine whether the product is to be dissolved in the organic phase from which it can be precipitated with ethanol (phenyl), or whether it will remain as the only insoluble product after slightly acidifying the reaction mixture (naphthyl).

The following examples illustrate the process of my invention and are not intended to limit its scope in any way. All parts and percentages are by weight unless otherwise indicated.

EXAMPLE I 27.8 g. leaddichloride (100 mmole) was added in portions with vigorous stirring to an ice-cooled solution of 300 mmole phenylmagnesiumchloride in 300 ml. THF so quickly that the temperature remained about 15° C. After stirring for one hour at ambient temperature, 14.8 g. 1,2-dichloroethane (75 mmole) was added as a whole to the greenish, slimy looking reaction mixture. After stirring for 5 hours, the reaction mixture had gradually become thick and cream-colored. Subsequently, the mixture was poured on ice, whereafter it was extracted with chloroform. The chloroform extract was evaporated to a certain extent and thereafter ethanol was added. The hexaphenyldilead precipitate was filtered off and sucked to dryness. It weighed 41.2 g. (94%). It decomposed at 150°–170° C., while blackening.

EXAMPLE II

Under stirring and cooling at 0° C., 27.8 g. leaddichloride (100 mmole) was added in portions to a solution of o-tolylmagnesiumchloride, prepared from 50.3 g. O-chlorotoluene (400 mmole) and 9.7 g. magnesium (400 mmole) in 180 ml. THF. After stirring for one hour, 28.2 g. 1,2-dibromoethane (150 mmole) was added dropwise to the mixture. After three hours of subsequent stirring the mixture was poured on ice. After slightly acidifying with acetic acid 17.1 g. hexa-o-tolyldilead was filtered off. From the organic phase another 1.3 g. was obtained. Total 18.4 g. (77%). The substance decomposed at 240–242° C. while blackening.

Analysis.—Pb. Found 43.22% by weight, calculated 43.11%.

EXAMPLE III

Under stirring and cooling at 0° C., 27.8 g. leaddichloride (100 mmole) was added in portions to a solution of 1-naphthylmagnesiumbromide in 500 ml. THF, prepared from 82.8 g. 1-bromonaphthalene (400 mmole) and 9.7 g. magnesium (400 mmole). After stirring for 2 hours, 9.4 g. 1,2-dibromoethane (50 mmole) was added dropwise to the mixture. After another 2 hours of stirring, the mixture was hydrolyzed with ice and neutralized with acetic acid. Filtering off yielded 67.6 g. crude hexa-1-naphthyldilead, which was very poorly dissolvable in all solvents examined. A small portion was purified by recrystallization from boiling bromobenzene. The product decomposed at 279–283° C., while blackening.

Analysis.—Pb: Found 34.76% by weight, calculated 35.19%.

EXAMPLE IV

Under stirring and cooling at 5° C., 4.2 g. 1,2-dibromoethane (22.3 mmole) was added to 165 ml. of a THF solution of 20 mmole of tri-2-naphthyllead magnesium bromide. The stoichiometric amount of ethylene was evolved at 35° C. within 20 minutes whereupon the mixture was immediately hydrolyzed with ice. The product was extracted with chloroform to give a 95% yield of hexa-2-naphthyldilead, decomposing at 180° C., while blackening.

Analysis.—Pb: Found 35.10% by weight, calculated 35.19%.

EXAMPLE V

Hexakis-(p-methoxyphenyl)dilead was prepared by the procedure of Example IV from leaddichloride, p-methoxyphenylmagnesium bromide and 1,2-dibromoethane in tetrahydrofuran. The product had a melting point of 196° C. with decomposition. The yield was 78.0%.

Analysis.—Found (percent): C, 47.88; H, 3.96; Pb, 39.29. Calculated for $C_{42}H_{42}O_6Pb_2$ (percent): C, 47.72; H, 4.00; Pb, 39.20.

The hexaaryldilead compounds obtained are primarily used as intermediaries in the formation of other organolead compounds, such as triaryllead halides which are active as biocides. Hexaaryldilead compounds are also effective heat and light stabilizers for chlorine-containing polymers, and in particular, stabilize polyvinylchloride against deterioration due to dehydrochlorination.

Many variations of the process described herein will suggest themselves to those skilled in the art. Accordingly, nothing in the preceding specification is intended to limit the scope of the invention as defined by the following claims.

I claim:

1. A process for the preparation of hexaaryldilead compounds having the general formula, $Ar_6Pb_2$, wherein Ar is an aryl radical selected from the group consisting of phenyl, naphthyl, and such radicals having substituents selected from the group consisting of halogen, lower alkyl, and lower alkoxy, which comprises causing a triarylplumbyl magnesium halide compound having the formula, $Ar_3PbMgX$, wherein Ar has the same meaning as above and X is halogen, to react chemically with a vicinal dihalogen alkane having from 2–6 carbon atoms and having the formula, R—CHX—CHX—R′, wherein R and R′ are hydrogen or aliphatic hydrocarbon radicals and X is halogen, and immediately isolating the end product.

2. A process for preparing hexaaryldilead compounds according to claim 1 wherein the triarylplumbyl magnesium compound is formed in situ by dissolving a lead dihalide compound and an aryl magnesium halide compound having the formula, ArMgX, wherein Ar is an aryl radical selected from the group consisting of phenyl, naphthyl, and such radicals having substituents selected from the group consisting of halogen, lower alkyl, and lower alkoxy, and X is halogen, in an electron-donating solvent in which the triarylplumbyl compound is stable.

3. A process according to claim 1 wherein the aryl group is chlorophenyl, tolyl, xylyl or methoxyphenyl.

4. A process according to claim 1 wherein the halogen X in the formula $Ar_3PbMgX$ is fluorine, chlorine or bromine.

5. A process according to claim 1 wherein the vicinal dihalogen alkane is 1,2-dichloroethane or 1,2-dibromoethane.

6. A process according to claim 1 wherein the reaction is carried out at a temperature ranging between about $-22°$ C. and $50°$ C.

7. A process according to claim 2 wherein the solvent is tetrahydrofuran.

8. A process according to claim 2 wherein the arylmagnesium halide is phenylmagnesium chloride and the dihalogen alkane is 1,2-dichloroethane.

References Cited

Shapiro et al., The Organic Compounds of Lead, Interscience, Publ. John Wiley/Sons, New York, pp. 27–32 and 363–6 (1968).

Glockling et al., J. Chem. Soc. (1961), pp. 4405–9.

Gilman et al., J. Amer. Chem. Soc., vol. 61, pp. 731–738 (1939).

Chemical Abstracts, vol. 36, pp. 4476–7 (1942).

Gilman et al., J. Amer. Chem. Soc., vol. 74, pp. 5924–27 (1952).

TOBIAS E. LEVOW, Primary Examiner

H. M. S. SNEED, Assistant Examiner

PO-1050
(5/69)

UNITED STATES PATENT OFFICE
CERTIFICATE OF CORRECTION

Patent No. 3,658,862               Dated July 13, 1972

Inventor(s) Louis C. Willemsens

It is certified that error appears in the above-identified patent and that said Letters Patent are hereby corrected as shown below:

Col. 1, line 34, "related" should be -- relates --.

Col. 1, line 63, "triarylpumbyl" should be -- triarylplumbyl --.

Col. 4, line 60, "$Ar_6Fb_2$" should be -- $Ar_6Pb_2$ --.

Col. 5, line 5, "Xis" should be -- X is --.

Signed and sealed this 28th day of November 1972.

(SEAL)
Attest:

EDWARD M. FLETCHER, JR.
Attesting Officer

ROBERT GOTTSCHALK
Commissioner of Patents